United States Patent
Brand

(10) Patent No.: US 8,195,459 B1
(45) Date of Patent: *Jun. 5, 2012

(54) AUGMENTATION AND CALIBRATION OF OUTPUT FROM NON-DETERMINISTIC TEXT GENERATORS BY MODELING ITS CHARACTERISTICS IN SPECIFIC ENVIRONMENTS

(75) Inventor: Michael Brand, Or Yehuda (IL)

(73) Assignee: Verint Americas, Inc., Roswell, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/876,207

(22) Filed: Sep. 6, 2010

Related U.S. Application Data

(63) Continuation of application No. 10/771,409, filed on Feb. 5, 2004, now Pat. No. 7,792,671.

(60) Provisional application No. 60/444,982, filed on Feb. 5, 2003.

(51) Int. Cl.
*G10L 15/00* (2006.01)

(52) U.S. Cl. .................................... 704/240; 704/231
(58) Field of Classification Search .............. 704/231, 704/240, 256.1
See application file for complete search history.

(56) References Cited

U.S. PATENT DOCUMENTS

| | | |
|---|---|---|
| 5,550,930 A | 8/1996 | Berman et al. |
| 5,625,748 A | 4/1997 | McDonough et al. |
| 6,397,181 B1 | 5/2002 | Li et al. |
| 7,792,671 B2 * | 9/2010 | Brand ........................ 704/240 |

* cited by examiner

*Primary Examiner* — Angela A Armstrong
(74) *Attorney, Agent, or Firm* — McKeon, Meunier, Carlin & Curfman

(57) ABSTRACT

Outputs of an automatic probabilistic event detection system, such as a fact extraction system, a speech-to-text engine or an automatic character recognition system, are matched with comparable results produced manually or by a different system. This comparison allows statistical modeling of the runtime behavior of the event detection system. This model can subsequently be used to give supplemental or replacement data for an output sequence of the system. In particular, the model can effectively calibrate the system for use with data of a particular statistical nature.

20 Claims, 2 Drawing Sheets

AUGMENTATION AND CALIBRATION OF OUTPUT FROM NON-DETERMINISTIC TEXT GENERATORS BY MODELING ITS CHARACTERISTICS IN SPECIFIC ENVIRONMENTS

CROSS-REFERENCE TO RELATED APPLICATIONS

This application is a continuation of U.S. patent application Ser. No. 10/771,409, filed on Feb. 5, 2004, and entitled "AUGMENTATION AND CALIBRATION OF OUTPUT from NON-DETERMINISTIC TEXT GENERATORS BY MODELING its CHARACTERISTICS IN SPECIFIC ENVIRONMENTS." This application is also related to and claims priority to U.S. provisional application entitled METHOD FOR AUTOMATIC AND SEMI-AUTOMATIC CLASSIFICATION AND CLUSTERING OF NON-DETERMINISTIC TEXTS having Ser. No. 60/444,982, by Assaf ARIEL, Itsik HOROWITZ, Itzik STAUBER, Michael BRAND, Ofer SHOCHET and Dror ZIV, filed Feb. 5, 2003 and incorporated by reference herein. This application is also related to the application entitled METHOD FOR AUTOMATIC AND SEMI-AUTOMATIC CLASSIFICATION AND CLUSTERING OF NON-DETERMINISTIC TEXTS having Ser. No. 10/771,315, by Assaf ARIEL, Michael BRAND, Itsik HOROWITZ, Ofer SHOCHET, Itzik STAUBER and Dror ZIV, filed on Feb. 5, 2004. The disclosures of all of the above-referenced applications are expressly incorporated by reference herein.

BACKGROUND OF THE INVENTION

1. Field of the Invention

The present invention is directed to text generation systems, such as speech-to-text, automatic character recognition (e.g., OCR) and fact extraction systems and, more particularly, to producing more meaningful confidence scores for text that is generated by such systems.

2. Description of the Related Art

In general, spoken document retrieval (SDR) is composed of two stages: transcription of speech and information retrieval (IR). Transcription of the speech is often referred to as speech-to-text (STT) or automatic speech recognition (ASR), and is often performed using a large vocabulary continuous speech recognizer (LVCSR). Information retrieval (IR) is a general term referring to all forms of data mining. One common form of data mining, for example, is query-based retrieval, where, based on a user's query, documents are retrieved and presented to the user, ordered by an estimated measure of their relevance to the query. Traditionally, this stage is performed on the text output of the first stage.

In transcribing spoken words to text, there is always a question of whether the words are transcribed correctly, particularly when the transcription is obtained automatically by an ASR system. The most accurate large vocabulary ASR systems receive clear voice signals and are trained to recognize speech by each individual using the system in a time-consuming process. In applications with numerous users, many of whom may use the system only once without first training the system and which receive low grade audio signals, such as those obtained via a telephone system, transcribing text is difficult and the resulting accuracy is low.

To improve the accuracy of transcription or speech recognition in applications with many users for whom the system has not been trained, the context of the speech is commonly used. For example in an interactive voice response (IVR) system that has speech output as well as input, communication with the system typically uses a very small vocabulary, often just "yes" or "no" and when more words may be included, a syntax may define where only certain words can be recognized in a predefined order, such as "City, Boston" or "City, Chicago". An example where a larger vocabulary is used is the transcription of communication between air traffic controllers and aircraft cockpits which follow a predictable pattern. In this case the pattern is known and as a result it is possible to produce an ASR system that can generate more accurate transcriptions of air traffic control communications than a general-purpose ASR system could.

However, there are many potential applications of ASR for which it is difficult to determine the rules that are followed in conversations, if any rules exist. LVCSRs solve this problem by approximating conversational speech through a Markovian model, where the probability of each word to appear is determined by the last few words that were uttered.

Most ASRs output recognition confidence scores or other additional information along with their text output. This output can then be used by IR systems that operate on the outputs of the ASR, as discussed in the concurrently filed application entitled METHOD FOR AUTOMATIC AND SEMI-AUTOMATIC CLASSIFICATION AND CLUSTERING OF NON-DETERMINISTIC TEXTS. For such systems it is beneficial that the output of the ASR will be as rich and as accurate as possible, even in its non-textual outputs.

It would be possible to improve the operation of ASRs and of these client IR systems, if a way could be found to augment and calibrate the outputs of ASRs, such as by an automatic way to map how well various parts of the model of the ASRs fit real conversations, and by correcting the outputs accordingly. Furthermore, it would be beneficial if such augmentation and calibration could be done by a person who has no access or knowledge of the internal operation of the ASR.

SUMMARY OF THE INVENTION

It is an aspect of the present invention to provide additional or alternate information for the output of an automatic system for probabilistic detection of events.

It is another aspect of the present invention to provide more meaningful confidence scores for text output by a text generation system.

It is a further aspect of the present invention to calibrate output of a text generation system for a particular environment.

The above aspects can be attained by a method of processing outputs of an automatic system for probabilistic detection of events, including collecting statistics related to observed outputs of the automatic system, and using the statistics to process an original output sequence of the automatic system and produce an alternate output sequence by at least one of supplementing and replacing at least part of the original output sequence. For example, data in the alternate output sequence may include confidence assessments regarding parts of at least one of the original and alternate output sequences, where the confidence assessments supplement or replace data in the original output sequence.

The alternate output sequence may include one or more of the following: (1) an alternate recognition score for at least one of the words, (2) at least one alternate word whose presence may have been one detectable event that transpired, (3) at least one alternate word along with a recognition score for the at least one alternate word, (4) at least one alternate sequence of words whose presence may have been another detectable event that transpired, (5) at least one alternate sequence of words along with a recognition score for at least one word that is part of the at least one alternate sequence of words, (6) an indication that no detectable event has transpired, (7) a word lattice describing a plurality of alternatives for detectable word sequences, and (8) a word lattice along with a recognition score for at least one among at least one word in the detectable word sequences, at least one path in the word lattice, and at least one edge in the word lattice.

In particular, the alternate output sequence may include information of a plurality of alternatives that can replace at least part of the original output sequence that can be used by client systems that can use the at least part of the original output sequence directly. The information collected may include at least one of noting and estimating correctness of at least one event that the automatic system detected, or information of detectable event(s) that may have transpired in correspondence with at least part of the original output sequence produced by the automatic system.

The alternate output sequence may be generated by building a first model modeling behavior of the automatic system as a process with at least one inner state, which may be unrelated to inner states of the automatic system, and inferring the at least one inner state of the process from the observed outputs of the automatic system; building a second model, based on the statistics obtained by collecting, to infer data to at least one of supplement and replace at least part of the original output sequence from the at least one inner state of the process in the first model; combining the first and second models to form a function for converting the original output sequence into the alternate output sequence; and using the function on the original output sequence of the automatic system to create the alternate output sequence. The function may be applied to different original output sequences of the automatic system to create additional alternate output sequences.

Preferably, the first model is one of a Generalized Hidden Markov process and a special case of a Generalized Hidden Markov process, while the second model is a parametric model built using at least one direct parametric estimation technique for inferring from at least one of the inner states. The at least one direct parametric estimation technique preferably includes at least one of maximal likelihood estimation and entropy maximization.

Preferably the generation of the second model for at least one of the inner states is based on at least one estimation technique utilizing information estimated for other inner states. For example, the estimation technique may use a mixture model or kernel-based learning.

The building of the first and second models may assume the inner states of the process to be fully determined by the observed outputs during at least one point in time. In particular, the inner states of the process may be assumed during at least one point in time to be fully determined by a subset of the observed outputs that includes at least an identity of at least one event detected by the automatic system. Furthermore, the building of at least one of the first and second models may use at least one discretization function.

These models may be built by collecting samples of statistically different sets of materials as initial training material. Preferably, parameters are identified that remain invariant between the statistically different sets of materials. This can improve estimation of at least one of the parameters and can enable training when available statistically self-similar sets of materials are too small to allow conventional training and to increase effectiveness of further training on material that is not statistically similar to initial training material. However, it is preferable that the material used to collect statistics is statistically similar to material used in later stages.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
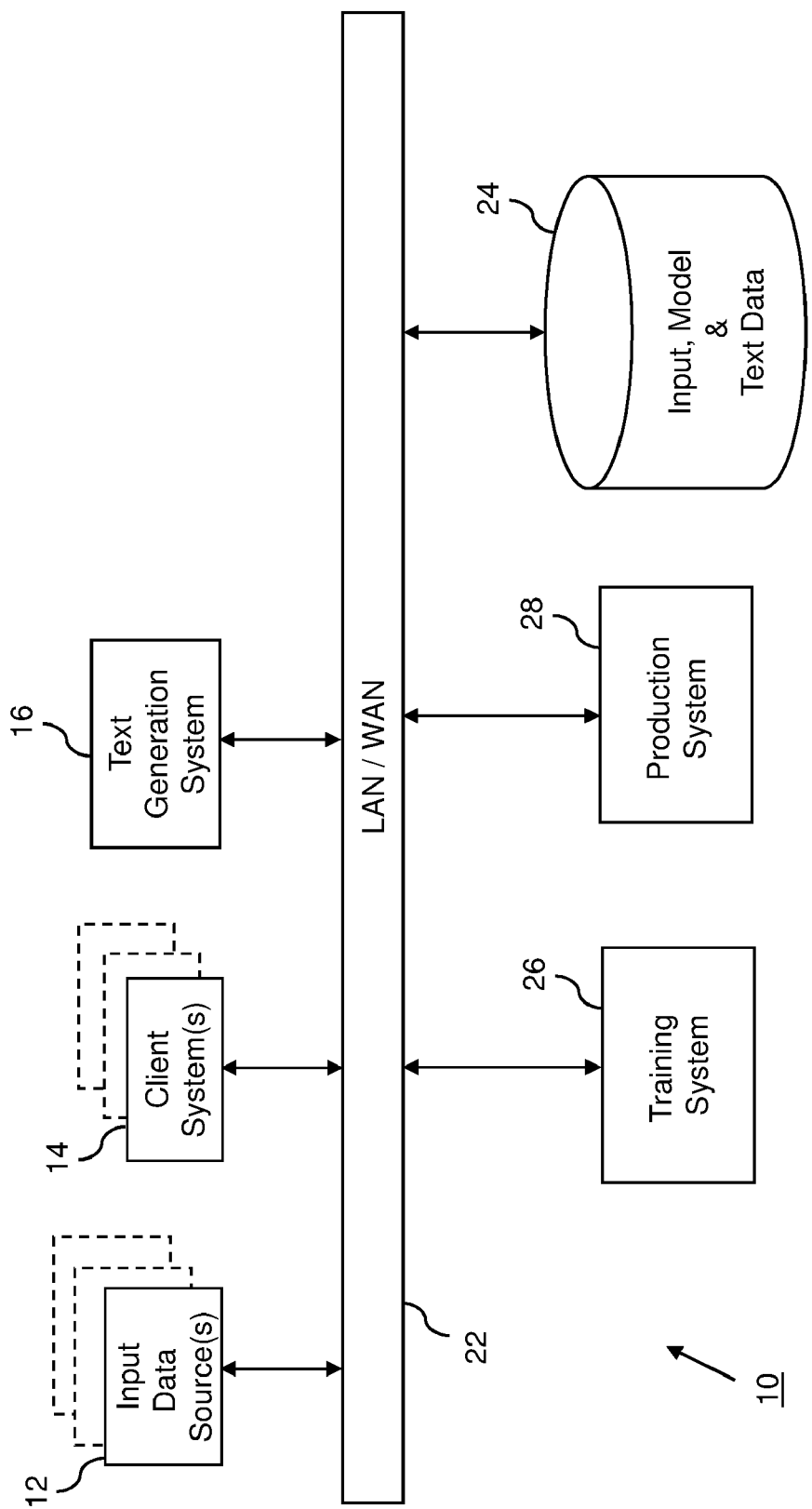
FIG. 1 is a block diagram of a system for generating text and meaningful confidence scores according to the invention.

The present invention may be implemented on many types of systems using many different types of data processing hardware. An example is illustrated in FIG. 1 for a system 10 that has one or more input data sources 12, and client system(s) 14 providing access to the system 10. The data provided by input data sources 12 are supplied to an automatic system for probabilistic detection of events, which typically is a text generation system 16, such as a speech-to-text system, an automatic character recognition (e.g., OCR) system, or a fact extraction system. Client system(s) 14 may include any known implementation of ranking, classification, filtering, clustering and labeling, all of which benefit in a similar manner from improved output from ASRs. In FIG. 1, text generation system 16 is shown connected to input data source(s) 12 and client system(s) 14 via network 22, but on a smaller scale system, these connections may be provided by a bus and peripheral interfaces in one or more housings.

As illustrated in FIG. 1, one or more storage devices 24 may be used to store input data for processing, the output of text generation system 16 and a model of how the text generation system operates, so that alternative output, such as more meaningful confidence scores, etc., can be produced as discussed below. Training system 26, illustrated in FIG. 1, is used to produce the model, while production system 28 uses the model to produce alternative output from the text output by text generation system 16. On a smaller scale system, training system 26 and production system 28 may be a single processor executing different program code, obtained from computer readable media, such as storage device 24, for training and production.

Figure 2:
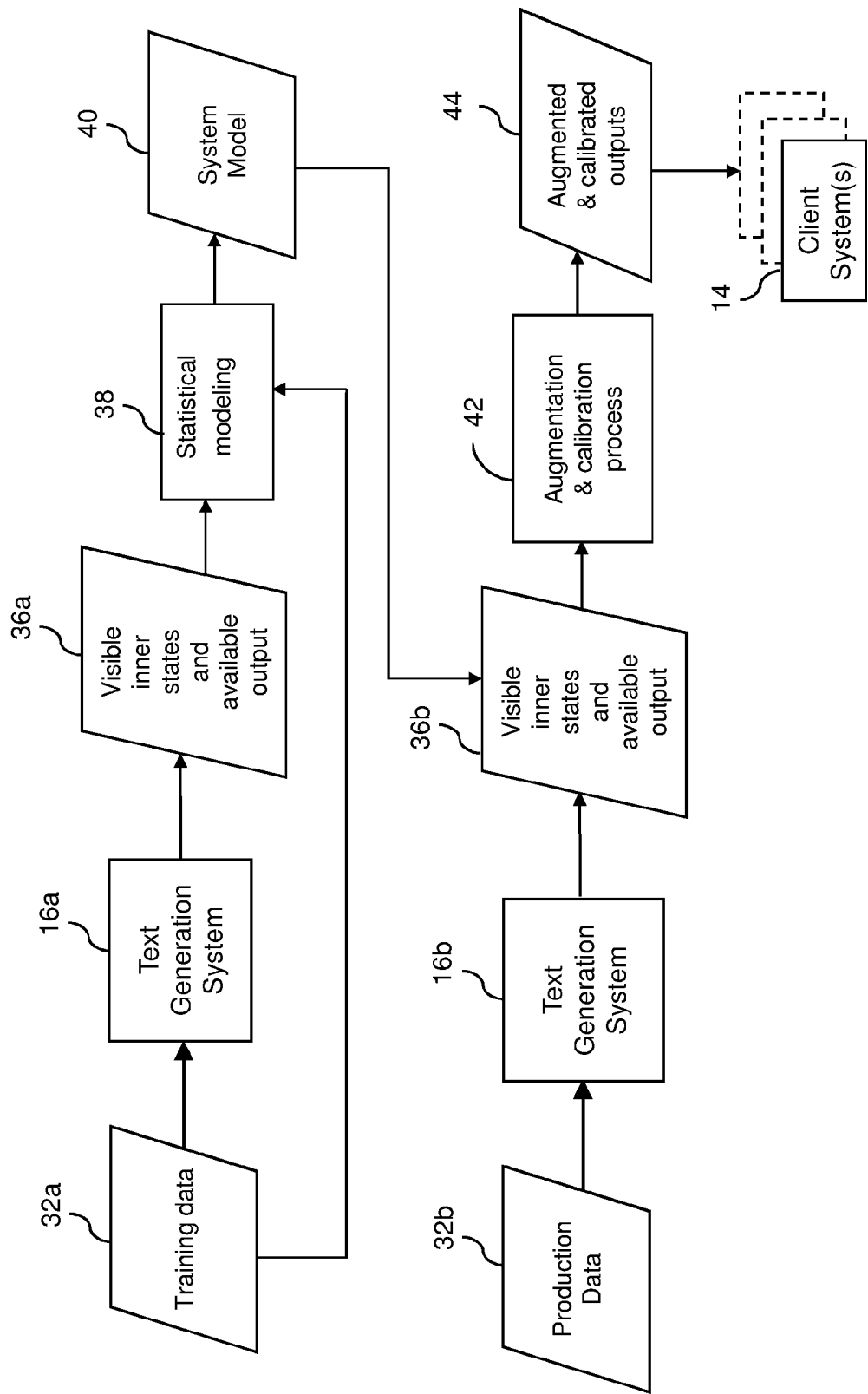
FIG. 2 is a flowchart of a method for producing meaningful confidence scores according to the invention.

A system like that illustrated in FIG. 1 executes instructions for controlling at least one computer system to perform the method illustrated in FIG. 2 to process outputs of an automatic system for probabilistic detection of events. Initially, training data 32a is input to the automatic system, represented by text generation system 16a at this point of the flow in FIG. 2. Visible inner states and available output 36a (during the training phase) are used by statistical modeling 38 to produce the model 40 of the system. This is accomplished by processing training data 32a and comparing the results with visible inner states and available output 36a.

As a simplified example, assume text generation system 16 outputs a single word at a time with no additional information. In this case, text generation system 16 can be modeled by assuming that its state at any point in time can be entirely determined by the word that it outputs at that time. To model its behavior in each state, training system 26 would count how many times each word is output by text generation system 16 and how many recognitions were correct when processing training data 32a obtained from a specific environment, such as telephone calls to an insurance company. These two pieces of information can be used to generate a percentage that can be used as a recognition confidence score whenever that word is output on production data 32b. This enables production system 28 to provide a confidence score, calibrated to the specific environment from which the training data was obtained, that was not included in an original output sequence generated by text generation system 16.

Therefore, training system 26 needs to be able to determine the accuracy of the output of text generation system 16 to be able to generate system model 40, preferably based on data that is more reliable than the output of text generation system 16. This can be done in several different ways, depending on the type of text generation system 16 used and the environment in which it is applied. For example, in the case of an ASR system, a human transcription of training data 32a can be obtained and compared with the output of the ASR system by training system 26. In addition, it may be possible to improve the quality of the alternatively processed training data, e.g., by using uncompressed voice signals in obtaining the transcription used for comparison. There may also be independent confirmation of the content, such as when notes about the conversation are recorded by one of the participants in a conversation used as training data 32a. When text generation system 16 is a fact extraction system, training data 32a may be selected so that the relevant facts that should be output by the fact extraction system are known and thus, training system 26 can compare visible states and available output 36a of the fact extraction system with the known relevant facts.

In addition, training system 26 may note the correct word each time an incorrectly recognized word is output by text generation system 16. In this case, production system 28 can output, whenever a word is recognized, not only a confidence score, but also a whole list of high-ranking alternatives, based on common misrecognition errors of text generation system 16.

During operations on production data 32b, text generation system 16b (ordinarily the same system as text generation system 16a) produces visible inner states and available output 36b. Using system model 40, augmentation and calibration process 42 produces augmented and calibrated outputs 44. The augmented and calibrated outputs 44 may be used to supplement the original output sequence of text generation system 16 as described above, or production system 28 may use an alternate output sequence obtained from system model 40 to replace the original output sequence. For example, if text generation system 16 produces a confidence score that is not as accurate as the confidence score obtained from system model 40, the confidence score obtained from system model 40 can be output to user(s) instead. Similarly, if training system 26 determines that an ASR systematically mistakes the word "pan" for "ban" and that "ban" is a word with very low likelihood of being used in operation of text generation system 16, production system 28 can simply replace "ban" with "pan" whenever the output 36b from text generation system 16 contains the word "ban".

In the above example, where the entire state of the ASR is modeled by the word it is currently outputting, a mapping from words to alternate output sequences used for replacement or additional output, can be created during the training. This mapping can be used whenever a word that appears in the mapping is detected in the output. For example, words may be mapped to scores, so that whenever a word is output, it is looked up and the score is added to the output (or may replace an existing score when the original output includes a score). If there is a possibility that generation system 16 will output a word that was not present in the training data, a procedure for handling the case is determined during the training.

The present invention has been described primarily with respect to a speech-to-text system, but is applicable to any automatic system for probabilistic detection of events, including automatic character recognizers, fact extraction systems and any systems generating non-deterministic text with confidence scores.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, training system 26 and production system 28 do not need to be connected, but may be two different computer systems running similar software with the system model 40 transferred from training system 26 to production system 28 using any conventional method, including removable computer readable media, such as CD-ROM(s).

What is claimed is:

1. A computer-implemented method of processing outputs of an automatic system for probabilistic detection of events, comprising:
   collecting statistics at a training system executing on a computing device, the statistics related to observed outputs of the automatic system, the collecting statistics comprising:
      providing at least one input sequence to the automatic system, the input sequence associated with a transcript obtained from a specific environment in which the automatic system operates; and
      observing an output sequence of a text generating system;
      comparing a number of times a word is in the output sequence to a number of correct recognitions in the at least one input sequence; and
      generating, from the comparing, a recognition confidence score that is calibrated to the specific environment;
   generating a system model from the collecting of statistics; and
   automatically supplementing and replacing at least part of an original output sequence of the automatic system to generate an alternate output sequence in accordance with the recognition confidence score.

2. The computer-implemented method as recited in claim 1, wherein data in the alternate output sequence includes the recognition confidence score regarding parts of at least one of the original and alternate output sequences, where the recognition confidence score supplements data in the original output sequence.

3. The computer-implemented method as recited in claim 1, wherein the alternate output sequence includes information of a plurality of alternatives that can replace at least part of the original output sequence.

4. The computer-implemented method as recited in claim 1, wherein the detected events are word recognition events.

5. The computer-implemented method as recited in claim 4, wherein the automatic system is an automatic speech recognition system.

6. The computer-implemented method as recited in claim 5, wherein the alternate output sequence includes at least one of:
   an alternate recognition score for at least one of the words,
   at least one alternate word that may have been one detectable event that transpired,
   the at least one alternate word along with a recognition score for the at least one alternate word, at least one alternate sequence of words that may have been another detectable event that transpired, the at least one alternate sequence of words along with a recognition score for at least one word that is part of the at least one alternate sequence of words, an indication that no detectable event has transpired, a word lattice describing a plurality of alternatives for detectable word sequences, and the word lattice along with a recognition score for at least one among at least one word in the detectable word sequences, at least one path in the word lattice, and at least one edge in the word lattice.

7. The computer-implemented method as recited in claim 1, further comprising:

building a first model modeling behavior of the automatic system as a process with at least one inner state, which may be unrelated to inner states of the automatic system, and inferring the at least one inner state of the process from the observed outputs of the automatic system;

building a second model, based on the statistics obtained by the collecting, to infer data to at least one of supplement and replace at least part of the original output sequence from the at least one inner state of the process in the first model;

combining the first and second models to form a function for converting the original output sequence into the alternate output sequence; and using the function on the original output sequence of the automatic system to create the alternate output sequence.

8. The computer-implemented method as recited in claim 7, further comprising repeating the using of the function on different original output sequences of the automatic system to create additional alternate output sequences.

9. The computer-implemented method as recited in claim 7, wherein the building of the first and second models assumes the inner states of the process to be fully determined by the observed outputs during at least one point in time.

10. The computer-implemented method as recited in claim 9, wherein the building of the first and second models assumes the inner states of the process during at least one point in time to be fully determined by a subset of the observed outputs that includes at least an identity of at least one event detected by the automatic system.

11. The computer-implemented method as recited in claim 1, further comprising repeating the collecting on several statistically different training materials.

12. A system for processing outputs of an automatic system for probabilistic detection of events, comprising:

an interface to receive observed outputs from the automatic system; and at least one processor programmed to:

collect statistics at a training system, the statistics related to observed outputs of the automatic system, the collecting statistics comprising:

providing at least one input sequence to the automatic system, the input sequence associated with a transcript obtained from a specific environment in which the automatic system operates; and observing an output sequence of a text generating system;

comparing a number of times a word is in the output sequence to a number of correct recognitions in the at least one input sequence; and generating, from the comparing, a recognition confidence score that is calibrated to the specific environment;

generate a system model from the statistics; and automatically supplement and replace at least part of an original output sequence of the automatic system to generate an alternate output sequence in accordance with the recognition confidence score.

13. The system as recited in claim 12, wherein at least part of the alternate output sequence includes information of a plurality of alternatives that can replace at least part of the original output sequence.

14. The system as recited in claim 12, wherein data in the alternate output sequence includes the recognition confidence score regarding parts of the alternatives, where the recognition confidence score supplements data in the original output sequence.

15. The system as recited in claim 12, wherein the detected events involve word recognition.

16. The system as recited in claim 15, wherein the automatic system is an automatic speech recognition system.

17. The system as recited in claim 12, wherein the alternate output sequence includes at least one of an alternate recognition score for at least one of the words, at least one alternate word that may have been one detectable event that transpired, the at least one alternate word along with a recognition score for the at least one alternate word, at least one alternate sequence of words that may have been another detectable event that transpired, the at least one alternate sequence of words along with a recognition score for at least one word that is part of the at least one alternate sequence of words, an indication that no detectable event has transpired, a word lattice describing a plurality of alternatives for detectable word sequences, and the word lattice along with a recognition score for at least one among at least one word in the detectable word sequences, at least one path in the word lattice, and at least one edge in the word lattice.

18. The system as recited in claim 12, wherein the processor is programmed to build a first model modeling behavior of the automatic system as a process with at least one inner state, which may be unrelated to inner states of the automatic system, and inferring the at least one inner state of the process from the observed outputs of the automatic system, to build a second model, based on the statistics obtained, to infer data to at least one of supplement and replace at least part of the original output sequence from the at least one inner state of the process in the first model, to combine the first and second models to form a function for converting the original output sequence into the alternate output sequence, and to apply the function to the original output sequence of the automatic system to create the alternate output sequence.

19. The system as recited in claim 18, wherein the processor applies the function on different original output sequences of the automatic system to create additional alternate output sequences.

20. The system as recited in claim 18, wherein the second model is a parametric model, and wherein the at least one processor builds the second model using at least one direct parametric estimation technique for inferring from at least one of the inner states.

* * * * *